United States Patent
Niinikoski et al.

(10) Patent No.: US 7,211,608 B2
(45) Date of Patent: May 1, 2007

(54) METHOD FOR PRETREATMENT OF FILLER, MODIFIED FILLER WITH A HYDROPHOBIC POLYMER AND USE OF THE HYDROPHOBIC POLYMER

(75) Inventors: Mari Niinikoski, Rusko (FI); Olof Malmstrom, Abo (FI); Markku Nurminen, Raisio (FI); Kenneth Sundberg, Abo (FI); Claes Zetter, Abo (FI)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 510 days.

(21) Appl. No.: 10/257,862

(22) PCT Filed: Apr. 17, 2001

(86) PCT No.: PCT/FI01/00376

§ 371 (c)(1),
(2), (4) Date: Oct. 17, 2002

(87) PCT Pub. No.: WO01/86067

PCT Pub. Date: Nov. 15, 2001

(65) Prior Publication Data

US 2003/0109617 A1    Jun. 12, 2003

(30) Foreign Application Priority Data

Apr. 18, 2000  (FI) ................................. 20000928

(51) Int. Cl.
*D21H 21/14* (2006.01)
*C08K 9/04* (2006.01)

(52) U.S. Cl. ................ 523/202; 162/181.5; 162/181.7; 162/181.1; 524/27; 428/403; 428/407

(58) Field of Classification Search ............ 161/181.1, 161/181.5, 181.7; 523/202; 524/27; 428/403, 428/407
See application file for complete search history.

(56) References Cited

U.S. PATENT DOCUMENTS

| 3,632,535 | A | * | 1/1972 | Gramera et al. ............ 524/734 |
| 3,716,504 | A | * | 2/1973 | Lindermann et al. ......... 524/26 |
| 4,115,187 | A | * | 9/1978 | Davidson ................. 162/168.7 |
| 4,301,017 | A |   | 11/1981 | Kightlinger et al. |
| 4,436,857 | A | * | 3/1984 | Kuan et al. ................. 524/260 |
| 4,835,212 | A |   | 5/1989 | Degen et al. |
| 4,892,590 | A |   | 1/1990 | Gill et al. |
| 4,925,530 | A |   | 5/1990 | Sinclair et al. |
| 5,527,430 | A |   | 6/1996 | Gill |
| 6,034,181 | A | * | 3/2000 | Bazaj et al. ................ 525/218 |

FOREIGN PATENT DOCUMENTS

| DE | 2510919 A | * | 9/1975 |
| DE | 198 06 745 |   | 8/1999 |
| EP | 0 026 091 |   | 4/1981 |
| GB | 1505641 |   | 3/1978 |
| JP | 10 183493 |   | 7/1998 |
| SU | 779 473 |   | 11/1980 |
| SU | 962 400 |   | 10/1982 |
| SU | 1 263 739 |   | 10/1986 |
| WO | WO 00 03093 |   | 1/2000 |
| WO | WO 00 46264 |   | 8/2000 |
| WO | WO 01 04416 |   | 1/2001 |

* cited by examiner

*Primary Examiner*—Tae H Yoon
(74) *Attorney, Agent, or Firm*—Shiela A. Loggins

(57) ABSTRACT

A modified filler used in the making of paper or the like, preparation of the filler and its use. The modified filler comprises a filler known as such, e.g. Calcium carbonate, kaolin, talc, titanium dioxide, sodium silicate and aluminum trihydrate or their mixture, and a hydrophobic polymer made of polymerisable monomers, which is added to the filler as a polymer dispersion or a polymer solution.

28 Claims, No Drawings

METHOD FOR PRETREATMENT OF FILLER, MODIFIED FILLER WITH A HYDROPHOBIC POLYMER AND USE OF THE HYDROPHOBIC POLYMER

This application is the U.S. national phase of international application PCT/FI01/00376 filed 17 Apr. 2001 which designated the U.S.

The present invention relates to a method defined by the preambles of the independent claims presented below for pretreatment of a filler used in the making of paper, board or the like, to a modified filler and to its use.

Fillers used in the making of paper and board are for instance calcium carbonate, such as precipitated calcium carbonate (PCC), kaolin, such as calcinated kaolin, talc, titanium dioxide, sodium silicate and aluminiumtrihydrate. Also mixtures of the above mentioned minerals can be used as fillers.

An object of paper makers, particularly makers of fine paper, is ever more to increase the filler content of paper due to cost reasons. However, due to a highly increased filler content the paper loses in strength, stiffness and other mechanical characteristics. A high filler content also increases the linting of paper. As a high filler content for instance an amount can be considered, which calculated as dry matter comprises >20% of the amount of the fibre suspension. An addition of a binding agent can affect the above-mentioned characteristics. An addition of binding agent can i.a. increase the strength of the finished paper.

Among other materials starch has been conventionally used as a binding agent. Starch is a hydrophilic material, which added in large amounts assists water to penetrate into the paper web. Thus the use of starch has also negative effects, particularly on the wet strength of the paper.

The use of starch can also have disadvantageous effects in the post-treatment of the paper, and for instance during printing it can cause too strong an absorption of the printing ink into the paper. Also other liquids, such as surface sizing agents and coatings may be absorbed in a non-desired manner into the paper.

Other hydrophilic binding agents, such as hydrophilic synthetic polymers, may cause the same problems as starch.

The object of the present invention is to provide an improved method for pretreatment of filler used in the making of paper, board or the like, a modified filler and its use.

Then the object is to provide such a method and an additive for the pretreatment of a filler which enables also large additions of the filler without the great disadvantages caused by the absorption of water mentioned above.

In order to attain the above-mentioned objects the method and the filler according to the invention are characterised in what is defined in the characterising parts of the independent claims presented below.

A typical method according to the invention for pretreatment of filler used in the making of paper, board or the like comprises the addition of a hydrophobic polymer made of polymerisable monomers to the filler in order to create a hydrophobic film on the surface of the filler particles and/or between adjacent filler particles. The filler is pretreated with the hydrophobic polymer so that it makes it more difficult for water to penetrate into the filler layer. Thus, the pretreatment of the filler can improve the wet strength and reduce the linting of the paper, board or the like to be made.

The addition of a hydrophobic polymer to the filler means in this description the combination of the polymer and the filler with each other. The combination can be made by mixing the polymer to the filler or by mixing the filler to the polymer. The combination can also be made so, that both materials are supplied simultaneously to the fibre suspension at the same dispensing point, so that the mixing occurs in the dispensing conduit immediately before reaching the fibre suspension. The mixing occurs at a high shear force.

The advantages of the invention are manifested particularly when a hydrophobic polymer is added to the filler in papermaking using high amounts of filler, over 20%, typically more than 25% of the dry solids content of the paper. In the solution according to the invention the hydrophobic polymer added to the filler is mainly a polymer which does not have to react covalently with the filler or with the cellulose fibre in order to create a barrier which restricts the penetration of water or increases retention. In the solution according to the invention the hydrophobic polymer forms a film-like barrier around the filler particles and between them. Previously reactive sizes where the effect restricting the penetration of water is created only when the sizes react with the fibres have been used in the papermaking. These sizes are not film creating polymers, whereby they do not create a film on the filler surface, and thus they do not reduce paper linting. Further, when they react with the fibre they prevent the creating of bonds between the fibres, and thus they have a negative effect on the paper strength properties.

The polymer added to the filler is typically a polymer which is created by solution or emulsion polymerisation with polymerisable monomers, and which has a molecular weight >5000, typically >10,000. In special cases the polymer can also contain a minor portion of smaller polymer molecules.

The polymer is added to the filler as a polymer dispersion or a polymer solution, which is polymerised using as a stabilising agent polysaccharide, such as starch, mannan and/or CMC. In addition it is possible to use as the stabilising agent a synthetic polymer, such as polyaminoamide or another polyaminopolymer, and/or a suitable dispersing agent, and/or anionic and/or cationic polymerisable monomers.

According to a preferred embodiment of the invention the polymer can be added to the filler as a polymer dispersion which is formed by copolymerising a monomer mixture of a polysaccharide dissolved in water, the monomer mixture containing at least one vinylic monomer. The temperature at which the polymer made by copolymerisation generates a film is about −50 to 200° C. typically 0 to 100° C. most typically 0 to 70° C. Regarding the prevention of Tinting a temperature of 10 to 50° C. is preferred. In this case a dense film is formed on the surface of the filler particles. However, the selected temperature depends on the temperature conditions in the paper machine.

The polysaccharide used to prepare the polymer, for instance starch, is chemically modified by cationic and/or anionic groups, whereby the substitution level (DS) regarding the cationic and/or anionic substituents is typically 0.1 to 2, most typically 0.1 to 1.

According to another preferred embodiment of the invention the polymer can be added to the filler as a stable product which is formed by mixing starch in granule form into a synthetic polymer, such as styrene maleic anhydrate (SMA), styrene maleic imide (SMI) or the like, and by letting the starch react with the polymer under the influence of heat.

According to an advantageous embodiment of the invention the polymer can be added to the filler as a polymer dispersion which comprises the following components, whose amounts are presented as dry solids content, a) 5 to 50%, advantageously 5 to 40% starch having a substitution level (DS) regarding cationic and/or anionic substituents of about 0.01 to 1, typically 0.04 to 1.0, and an intrinsic viscosity of >1.0 dl/g in the cationised and/or anionised state, typically 1.5 to 15 dl/g;

b) 50 to 95%, advantageously 60 to 95% of a monomer mixture containing at least one vinylic monomer, and c) water.

The most typically used monomers in the preparation are for instance styrene, 1,3-butadiene, butylacrylate, methyl methacrylate, ethyl acrylate, 2-ethyl hexyl acrylate, acrylonitrile, and vinyl acetate. Also cationic and/or anionic monomers can be used in the preparation.

The temperature at which the polymer which is formed by a monomer mixture will generate a film is typically 10 to 50° C. advantageously 20 to 50° C.

The monomer mixture used in the preparation of the polymer dispersion can comprise e.g. about 40 to 70% acrylates and about 30 to 60% styrene, whereby the monomer mixture can comprise of, for instance, the following components:

a) acrylonitrile, 0 to 19%, typically 5 to 19%, most typically about 19%;

b) acrylates, 10 to 60%, typically 20 to 50%, most typically about 30%, and c) styrene, 10 to 60%, typically 20 to 40%, most typically about 30%.

As an answer to the problems regarding wet strength and linting in papermaking the solution according to the invention thus proposes the use of an additive containing a hydrophobic polymer for pretreatment of the filler. In this case the additive is typically a hydrophobic polymer made of polymerisable monomers, which is added to the filler as a polymer dispersion or as a polymer solution in order to create a hydrophobic film on the surface of the filler particles and thus to improve the characteristics of the paper or the like to be manufactured, such as to increase wet strength and to reduce linting. The polymer is made of a monomer mixture containing at least one vinylic monomer. According to a preferred embodiment of the invention the polymer is made of a monomer mixture containing at least acrylates and styrene. The monomer mixture comprises e.g.

A) acrylonitrile or methacrylonitrile or a mixture of them;

b) acrylates; and c) styrene or other copolymerable monomers unsubstituted by ethylene.

The invention is illustrated with the aid of the enclosed examples of embodiments.

EXAMPLE 1

Paper (80 g/m$^2$) was prepared in a sheet mould where the fibres were oriented with the aid of flow. In the preparation a cellulose mixture of birch and pine was used in proportion 70/30 beaten to about 35° SR. The temperature of the fibre suspension was 45° C. In addition precipitated calcium carbonate (PCC) was used as filler, at a level of 25% of the total pulp composition. To the fibre suspension 1% pulp starch with a cationic degree DS of 0.035 was also added. As retention agents, which were dispensed after the filler addition, 0.05% Percol 162 and 0.15% Hydrocol O were used. The results are shown in Table 1 below.

TABLE 1

| Test point | Active material | Amount (%) | Geometric tensile strength index of wet paper (Nm/g) | Geometric tensile strength index of dry paper (Nm/g) | Cobb$_{60}$ (g/m$^2$) | HST (s) |
|---|---|---|---|---|---|---|
| 1 | AKD | 0.13 | 2.715 | 37.9 | 32.2 | 262 |
| 2 |  | 0.25 | 1.914 | 38.8 | 20.1 | 419 |
| 3 |  | 0.25 | 1.890 | 38.5 | 19.7 | 439 |
| 4 | Starch | 0.25 | 1.785 | 42.3 | 19.7 | 407 |
| 5 |  | 0.50 | 1.701 | 48.8 | 21.5 | 376 |
| 6 | SMA | 0.25 | 2.079 | 45.8 | 18.5 | 567 |
| 7 |  | 0.50 | 2.268 | 49.1 | 17.3 | 635 |
| 8 | SA | 0.25 | 2.117 | 38.5 | 19.9 | 479 |
| 9 |  | 0.50 | 2.344 | 39.2 | 19.0 | 536 |

In test points 1 and 2 alkylketene dimer dispersion (AKD) was mixed to the filler material before adding it to the fibre suspension.

In test point 3 the AKD was added to the fibre suspension, and the filler without AKD addition was added.

In test points 4 to 9 the AKD was added to the fibre suspension in a similar manner as in point 3, using the standard amount 0.25%, and the other chemicals were admixed to the filler material before adding to the fibre suspension. The chemical dosage was calculated to correspond to a certain percentage of active chemical of the paper's dry solids content.

In test points 4 and 5 starch was used, which had been used to stabilise the AKD dispersion, in order to illustrate the effect of starch in the test points 1 to 3.

In test points 6 and 7 ammonium salt of styrene maleic acid was added to the filler material, whereby the salt had been treated at an active material ratio 1:1 with the same starch which was used in the test points 4 and 5.

In test points 8 and 9 styrene acrylate acrylonitrile copolymer, the preparation of which is disclosed in more detail in the patent application PCT/FI00/00084, example 4.

The strength of the wet paper was determined from humid paper (dry solids content 45%) before drying.

In the example 1 it can be seen that AKD improves the hydrophobicity of the paper, but impairs the paper's strength characteristics. The strength of the dry paper is obtained with the starch used in dispersing the AKD. However, the starch reduces the wet strength of the paper. Both SMA and styrene acrylate substantially improve the strength properties of wet paper and have an improving effect also on the dry strength and on the hydrophobicity of the paper.

EXAMPLE 2

Paper (80 g/m$^2$) was made in a test paper machine having a web width of 70 cm and the speed 80 m/min. In the making a cellulose mixture of birch and pine in proportions 70/30 beaten to about 28° SR was used. In addition precipitated calcium carbonate (PCC) was used as filler, at a level of 25% of the total pulp composition. To the fibre suspension 0.9% pulp starch with a cationic degree DS of 0.045 and 0.2% of AKD dispersion was also added, the dosage determined according to the AKD concentration. As retention agents, which were dispensed after the filler addition, we used 0.03% Percol 162 and 0.15% Hydrocol O.

In this example the styrene acrylate acrylonitrile copolymer mentioned in example 1 was used as a variable, which was either dispensed to the fibre suspension before the filler, or mixed to the filler. The dispensed amount was in both test points the same, 0.6% of the paper's dry solids content. The tensile strength of wet paper was determined from paper which had been immersed in water so long that a paper's dry solids content of 45% was obtained. The results are presented in Table 2 below.

TABLE 2

|  | Geometric tensile strength index of wet paper (Nm/g) | Geometric tensile strength index of dry paper (Nm/g) | Cobb$_{60}$ (g/m$^2$) | HST (s) | Amount of lint (mg) |
|---|---|---|---|---|---|
| Addition to the fibre suspension | 1.051 | 32.24 | 22.0 | 114 | 41.7 |
| Addition to the filler | 1.154 | 32.56 | 20.2 | 184 | 35.8 |

In the table it can clearly be seen that the addition of the hydrophobic polymer provides a better wet strength value and linting value, when the addition is made to the filler instead of to the fibre suspension. In the table it can be seen that the paper linting is much lower when the hydrophobic polymer is dispersed to the fibre suspension after it has been admixed to the filler, compared to a situation where the polymer would have been dispersed directly to the fibre suspension. The dispersion to the filler also had an impact on the paper's strength and hydrophobicity.

The method according to this invention, where the filler is pretreated or modified by a hydrophobic material which creates a film, increases the hydrophobicity of the paper or the like, and at the same time it improves the strength characteristics of both dry and wet paper. Further as advantages of the solution according to the invention can be mentioned, that the method is able to reduce the paper linting.

The invention is not intended to be limited to the exemplary embodiments presented above, but the intention is to be able to implement the invention widely within the scope defined by the enclosed claims.

The invention claimed is:

1. A method for making paper or board comprising the steps of
   pretreating a filler before the filler is supplied to a fibre suspension,
   wherein the pretreatment comprises
   adding a hydrophobic polymer made of polymerisable monomers polymerised in the presence of a polysaccharide, to the filler in order to create a hydrophobic film on the surface of the filler particles and/or between adjacent filler particles, and
   the polymer added to the filler is added as a polymer dispersion or a polymer solution, which polymer is polymerised using a polysaccharide as a stabilising agent,
   adding the pretreated filler to the fibre suspension and forming a web from the fibre suspension.

2. A method according to claim 1, characterised in that the polymer added to the filler is a polymer, which is made by solution polymerisation or emulsion polymerisation of polymerisable monomers.

3. A method according to claim 1, characterised in that the polymer added to the filler is mainly an inert polymer, which does not react covalently with the filler or with the cellulose fibre.

4. A method according to claim 1, characterised in that the polymer added to the filler is added as a polymer dispersion or a polymer solution, which is polymerised using further as a stabilising agent,
   a synthetic polymer and/or a dispersing agent.

5. A method for pretreatment of filler, the pretreatment being conducted before the filler is supplied to the fibre suspension, characterised in that the pretreatment comprises the addition of a hydrophobic polymer made of polymerisable monomers to the filler in order to create a hydrophobic film on the surface of the filler particles and/or between adjacent filler particles, wherein the polymer is added to the filler as a stable product which is formed by mixing starch in granule form into a synthetic polymer, and by letting the starch react with the polymer under the influence of heat.

6. A method according to claim 1, characterised in that the polymer to be added to the filler is added as a polymer dispersion which dispersion is formed by copolymerising a monomer mixture of a polysaccharide dissolved in water, the monomer mixture containing at least one vinylic monomer.

7. A method according to claim 6, characterised in that the polysaccharide is chemically modified by cationic and/or anionic groups, whereby the substitution level (DS) regarding the cationic and/or anionic substituents is 0.1 to 2.

8. A method according to claim 6, characterised in that the temperature at which the polymer made by copolymerisation creates a film is about −50 to 200° C.

9. A method according to claim 1, characterised in that the polymer to be added to the filler is added as a polymer dispersion wherein the polymer is formed by polymerizing the following components, whose amounts are presented as dry solids content,
   a) 5 to 50% starch having a substitution level (DS) regarding cationic and/or anionic substituents of about 0.01 to 1, and an intrinsic viscosity of >1.0 dl/g in a cationised and/or anionised state,
   b) 50 to 95% of a monomer mixture containing at least one vinylic monomer, and
   c) water.

10. A method according to claim 9, characterised in that the film generating temperature of the polymer which is formed by said monomer mixture is 10 to 50° C.

11. A method according to claim 9, characterised in that the monomer mixture comprises 40 to 70% acrylates and 30 to 60% styrene.

12. A method according to claim 9, characterised in that the monomer mixture comprises
   a) acrytonitrile, 0 to 19%;
   b) acrylates, 10 to 60%, and
   c) styrene, 10 to 60%.

13. A method according to claim 1, characterised in that the hydrophobic polymer is added to the filler, which uses large amounts of filler, the amounts being >20%, of the dry solids content of the paper.

14. A fiber suspension comprising a modified filler which modified filler comprises a hydrophobic polymer made of polymerisable monomers polymerised in the presence of a polysaccharide, which polymer is added to the filler as a polymer dispersion or a polymer solution, and which polymer is polymerised using a polysaccharide, as a stabilising agent, wherein the polymer is formed from monomer or monomers selected from the group consisting of styrene, 1,3-butadiene, butylacrylate, methyl methacrylate, ethyl acrylate, 2-ethyl hexl acrylate and acrylonitrile.

15. A paper or board comprising the fiber suspension according to claim 14.

16. The paper or board according to claim 15, characterised in that the polymer is formed from a monomer mixture containing at least one vinylic monomer.

17. A paper or board comprising a fiber suspension comprising a modified filler which modified filler comprises
a filler, characterised in that the modified filler comprises
a hydrophobic polymer made of polymerisable monomers polymerized in the presence of a polysaccharide, which polymer is added to the filler as a polymer dispersion or a polymer solution, and which polymer is polymerised using a polysaccharide, as the stabilising agent, in order to create a hydrophobic film on the surface of the filler particles and/or between adjacent filler particles before the filler is supplied to the fibre suspension, characterised in that the polymer is formed from a monomer mixture containing
a) acrylonitrile or methacrylonitrile or a mixture thereof,
b) acrylates, and
c) styrene or other copolymerisable monomers unsubstitued by ethylene.

18. The paper or board according to claim 15, characterised in that the polymer is formed from a monomer mixture containing
a) 0 to 19% of acrylonitrile;
b) 10 to 60% acrylates, and
c) 10 to 60% styrene.

19. A paper or board comprising a modified filler which modified filler comprises
a filler, characterised in that the modified filler comprises
a hydrophobic polymer made of polymerisable monomers polymerized in the presence of a polysaccharide, which polymer is added to the filler as a polymer dispersion or a polymer solution, and which polymer is polymerised using a polysaccharide, as the stabilising agent, in order to create a hydrophobic film on the surface of the filler particles and/or between adjacent filler particles before the filler is supplied to the fibre suspension, characterised in that the polymer dispersion is formed by polymerizing the following components, whose amounts are presented as dry solids content,
a) 5 to 50% starch having a substitution level (DS) regarding cationic and/or anionic substituents of about 0.01 to 1, and an intrinsic viscosity of >1.0 dl/g in a cationised and/or anionised state;
b) 50 to 95% of a monomer mixture containing at least one vinylic monomer, and
c) water.

20. The paper or board according to claim 17, wherein the polysaccharide is selected from the group consisting of starch, mannan, carboxymethylcellulose and/or mixtures thereof.

21. The paper or board as in claim 17, wherein the filler is selected from the group consisting of calcium carbonate, kaolin, talc, titanium dioxide, sodium silicate, aluminiumtrihydrate and mixtures thereof.

22. A method according to claim 1, wherein the filler is selected from the group consisting of calcium carbonate, kaolin, talc, titanium dioxide, sodium silicate, aluminiumtrihydrate and mixtures thereof.

23. A method according to claim 1, wherein the polysaccharide is selected from the group consisting of starch, mannan, carboxymethylcellulose and mixtures thereof.

24. A method of increasing the wet strength or reducing linting of paper by pretreating the filler according to claim 1.

25. A method according to claim 4, wherein the synthetic polymer is selected from the group consisting of styrene maleic anhydrate (SMA) and styrene maleic imide (SMI).

26. A fiber suspension comprising a modified filler which modified filler comprises
a hydrophobic polymer made of polymerisable monomers polymerised in the presence of a polysaccharide, which polymer is added to the filler as a polymer dispersion or a polymer solution, and which polymer is polymerised using a polysaccharide, as a stabilising agent, wherein the polymer is formed from a monomer mixture containing
a) acrylonitrile or methacrylonitrile or a mixture thereof,
b) acrylates, and
c) styrene or other copolymerisable monomers unsubstitued by ethylene.

27. The paper or board according to claim 19, wherein the polysaccharide is selected from the group consisting of starch, mannan, carboxymethylcellulose and/or mixtures thereof.

28. The paper or board as in claim 19, wherein the filler is selected from the group consisting of calcium carbonate, kaolin, talc, titanium dioxide, sodium silicate, aluminiumtrihydrate and mixtures thereof.

* * * * *